July 26, 1966 A. LENDER 3,263,185

SYNCHRONOUS FREQUENCY MODULATION OF DIGITAL DATA

Filed Feb. 6, 1964 3 Sheets-Sheet 1

INVENTOR.
ADAM LENDER

BY

Lippincott, Ralls & Hendricson
ATTORNEYS

July 26, 1966 A. LENDER 3,263,185

SYNCHRONOUS FREQUENCY MODULATION OF DIGITAL DATA

Filed Feb. 6, 1964 3 Sheets-Sheet 2

INVENTOR.
ADAM LENDER

BY

Lippincott, Ralls & Hendricson
ATTORNEYS

INVENTOR.
ADAM LENDER
BY
Lippincott, Ralls & Hendricson
ATTORNEYS

United States Patent Office 3,263,185

Patented July 26, 1966

3,263,185

SYNCHRONOUS FREQUENCY MODULATION OF DIGITAL DATA

Adam Lender, Palo Alto, Calif., assignor, by mesne assignments, to Automatic Electric Laboratories, Inc., Northlake, Ill., a corporation of Delaware Filed Feb. 6, 1964, Ser. No. 342,891

11 Claims. (Cl. 332—9)

The present invention relates generally to the conversion of a digital waveform consisting of pulses varying between two discrete amplitude levels to a frequency modulated waveform having discernible intelligence of such levels for transmission over a carrier or other communications channel of limited bandwidth. The invention is more particularly directed to the synchronous frequency modulation of straight binary or duobinary data by means of purely digital circuits with a resultant substantial simplification in the frequency modulation conversion and transmitting system.

Various data transmission systems are known for the transmission of serialized digital data over a voice-bandwidth channel derived on conventional wire line, cable, carrier, microwave, or an equivalent transmission medium. In this regard, the transmission systems are frequently of the frequency modulation type wherein the digital data controls the frequency of a frequency modulation oscillator. The digital data may, for example, key a voltage controlled oscillator which generates a first given frequency in response to one amplitude level of the data waveform and a second given frequency in response to the second amplitude level thereof. The keyed oscillator frequencies may then be transmitted directly over the transmission medium. More preferably, however, the keyed oscillator frequencies are first mixed with a carrier frequency as by means of a product modulator. One of the two resulting frequency modulation sidebands is then suppressed by a single sideband filter, while the other sideband is passed for transmission over the transmission medium. Although the phase of the frequency shift keyed output is continuous in either of the foregoing cases, the changes from one amplitude level of the input data to the other may occur at any phase. The input data and frequency modulation output are thus a synchronous, and undesirable keying loss with attendant time jitter are present. Furthermore, the apparatus required in keyed oscillator conversion systems of the foregoing types is relatively complex and expensive. This is particularly true of the keyed carrier oscillators which must possess a high degree of frequency stability.

It is, therefore, an object of the present invention to provide an improved process for converting ditigal data to a frequency modulated waveform having discernible intelligence of the digital data.

An extremely important object of the invention is the provision of a synchronous digital data to frequency modulation conversion process whereby changes in the frequency modulation wave take place only when the phase is 0° or 180°. As a result, keying loss and attendant time jitter are effectively reduced to zero.

Another object of the invention is to provide for synchronous frequency modulation of digital data which is applicable to both duobinary and straight binary modes of processing.

It is a further object of the invention to provide for the synchronous frequency modulation of digital data by means of simple digital circuits with a resultant material simplification and reduction in cost of the conversion system compared to existing systems for converting digital data to a frequency modulated wave.

Other objects and advantages of the invention will become apparent upon consideration of the following description in conjunction with the accompanying drawings, wherein.

In accordance with the basic aspects of the present invention, a digital waveform having a series of pulses of two discrete amplitude levels respectively representing, for example, "mark" and "space" conditions is synchronously converted to frequency modulated pulses varying between upper and lower frequencies in a manner which is indicative of the two amplitude levels of the digital waveform. A straight binary mode of processing the digital waveform may be employed wherein a binary "0" corresponds to the "mark" condition and a binary "1" corresponds to the "space" condition, or vice versa. In this case, a frequency modulated output is produced, in a manner subsequently described, having an upper frequency indicative of the binary "0" or "mark" condition and a lower frequency indicative of the binary "1" or "space" condition, or vice versa. Preferably, however, a duobinary mode of processing the digital waveform is employed with the invention in order to increase the bit capacity of the communications system without increasing the bandwidth. The digital waveform is converted to a suitable binary pattern which is conductive to the duobinary data transmission process. The resulting frequency modulated output has upper and lower frequencies respectively indicative of binary "0" and "1" conditions of the binary pattern, or vice versa, as in the instance of the straight binary mode of processing. However, the frequency modulated output now exhibits a change between the upper and lower frequencies, or vice versa, as an indication of the "space" condition, and no change in frequency as an indication of the "mark" condition of the input digital waveform, or vice versa. Irrespective of whether the input data is processed in the straight binary or duobinary mode, as an extremely important feature of the invention, the data rate and the output binary frequency modulated wave are synchronous. As a result, the phase of the frequency modulated wave is always continuous and changes in frequency take place only when the phase is 0° or 180°. This is highly advantageous inasmuch as the usual so-called "keying loss" of data and attendant time jitter are effectively reduced to zero.

Figure 1:
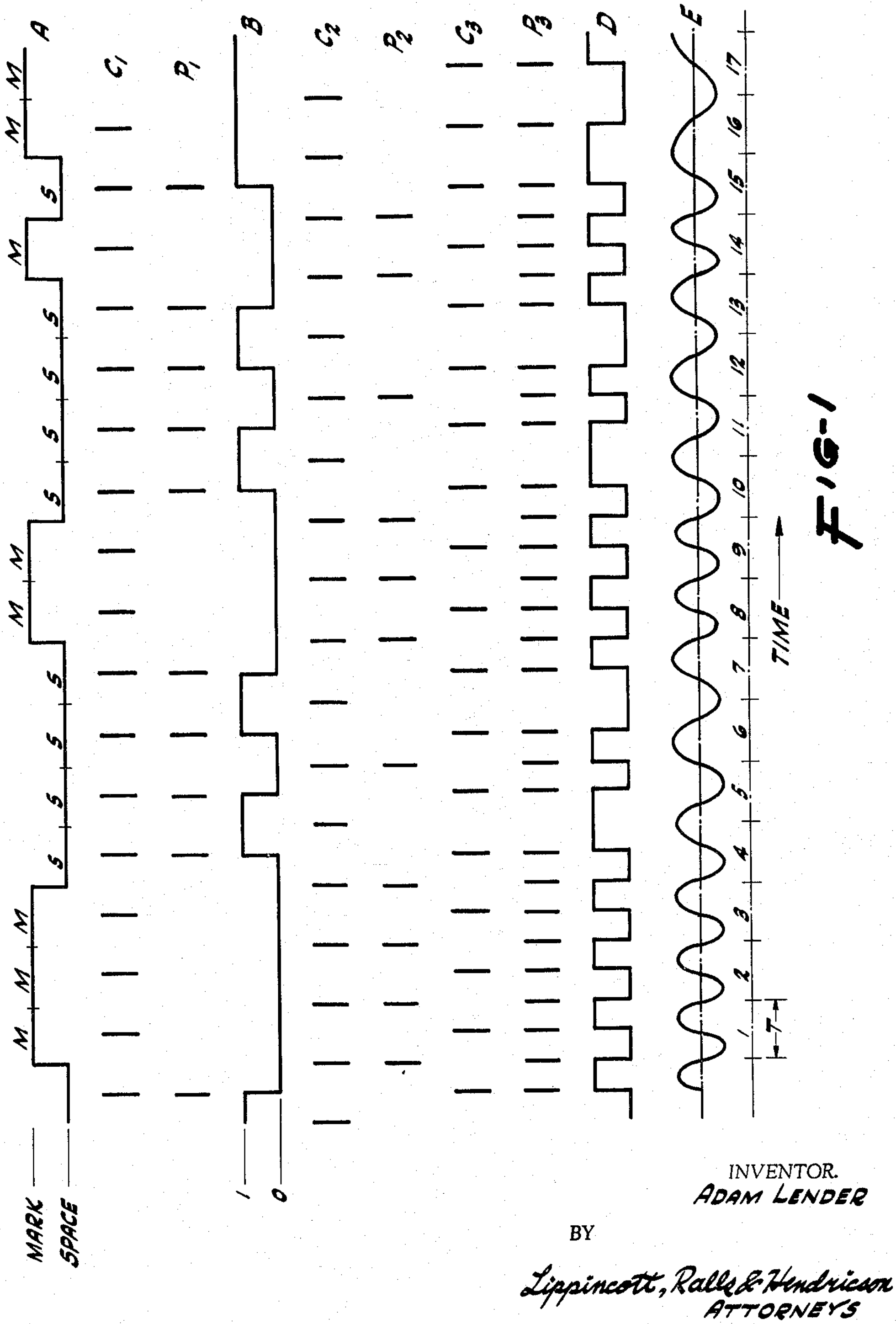
FIGURE 1 is a graphical illustration of various waveshapes representative of the synchronous digital data to frequency modulation conversion process of the invention in the duobinary mode thereof.
Figure 2:
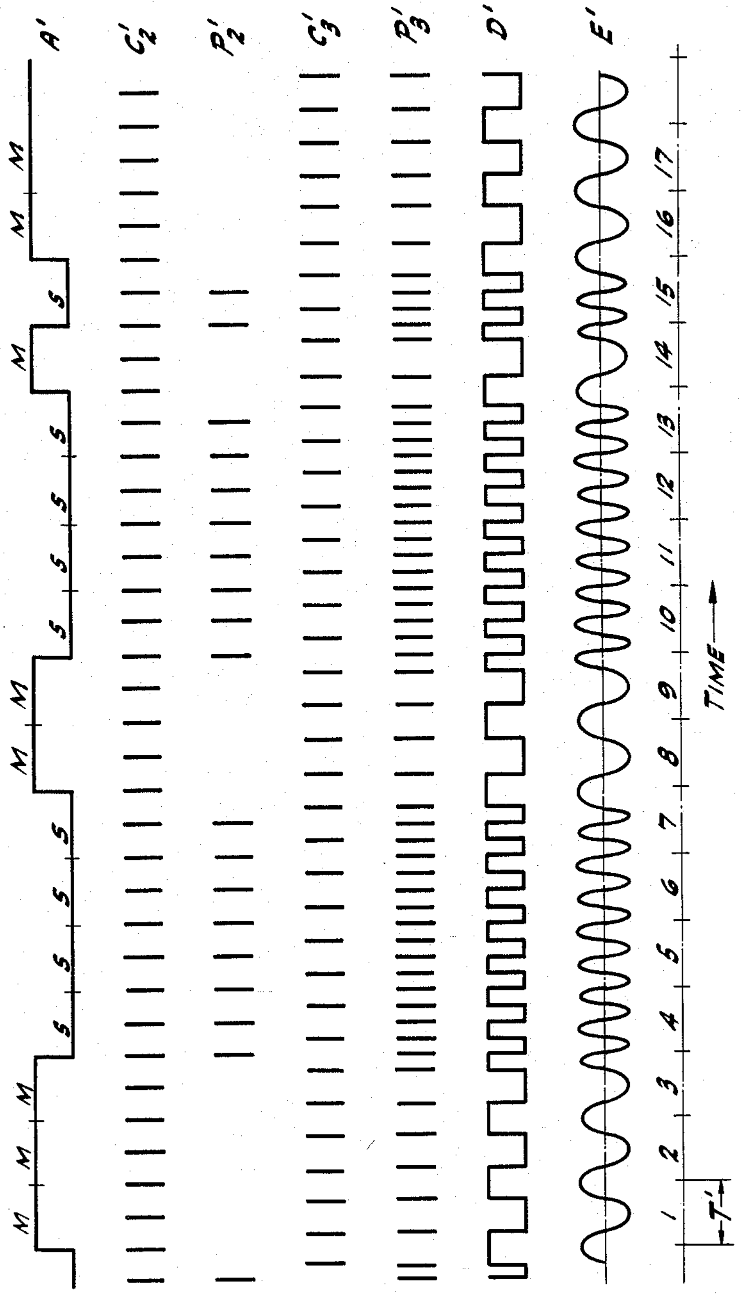
FIGURE 2 is a graphical illustration of various waveshapes representative of the synchronous digital data to frequency modulation conversion process of the invention in the straight binary mode thereof.

The invention will be better understood upon separately considering the duobinary and straight binary modes of processing in detail with respect to the waveforms of FIGURES 1 and 2, respectively. Considering first the duobinary data processing mode of the invention and referring to FIGURE 1, an input digital waveform A has two discrete amplitude levels $s$ and $m$ which are respectively representative of "space" and "mark" conditions, for example. Waveform A has a bit time slot T, and therefore a bit speed of $1/T$. Waveform A is converted to a suitable binary pattern for duobinary processing, in the present instance the digital differential of waveform A. This is preferably accomplished by providing a series of clock pulses $C_1$ having a rate equal to the bit speed $1/T$ of waveform A. Clock pulses $C_1$ are digitally combined with waveform A in such a manner that pulses $P_1$ are produced in time correspondence with the clock pulses $C_1$ for those clock pulses occurring during intervals of the waveform A at one level thereof, but not for clock pulses during intervals at the other level. In the illustrated case, pulses $P_1$ are produced for "space" intervals of waveform A, but not for "mark" intervals thereof. In other words, the clock pulses $C_1$ are gated by the waveform A, the gate being "open" in response to a "space" and being "closed" in response to a "mark." Pulses $P_1$ are in turn complemented to produce waveform B which is the digital differential of waveform A. Digital differential B is of binary form and switches between binary "0" and binary "1" states, as illustrated.

Digital differential B is digitally combined with a second series of clock pulses $C_2$ in the manner set forth hereinafter. Clock pulses $C_2$ have the same rate as clock pulses $C_1$ but are shifted in phase by 180° relative thereto. Digital differential B and clock pulses $C_2$ are so combined that pulses $P_2$ in time correspondence with clock pulses $C_2$ are produced for clock pulses occurring during binary "0" intervals, but not for clock pulses occurring during binary "1" intervals of the digital differential B. The inverse condition may, of course, be alternatively employed with pulses being produced for binary "1" and no pulses produced for binary "0".

Figures 3, 4:
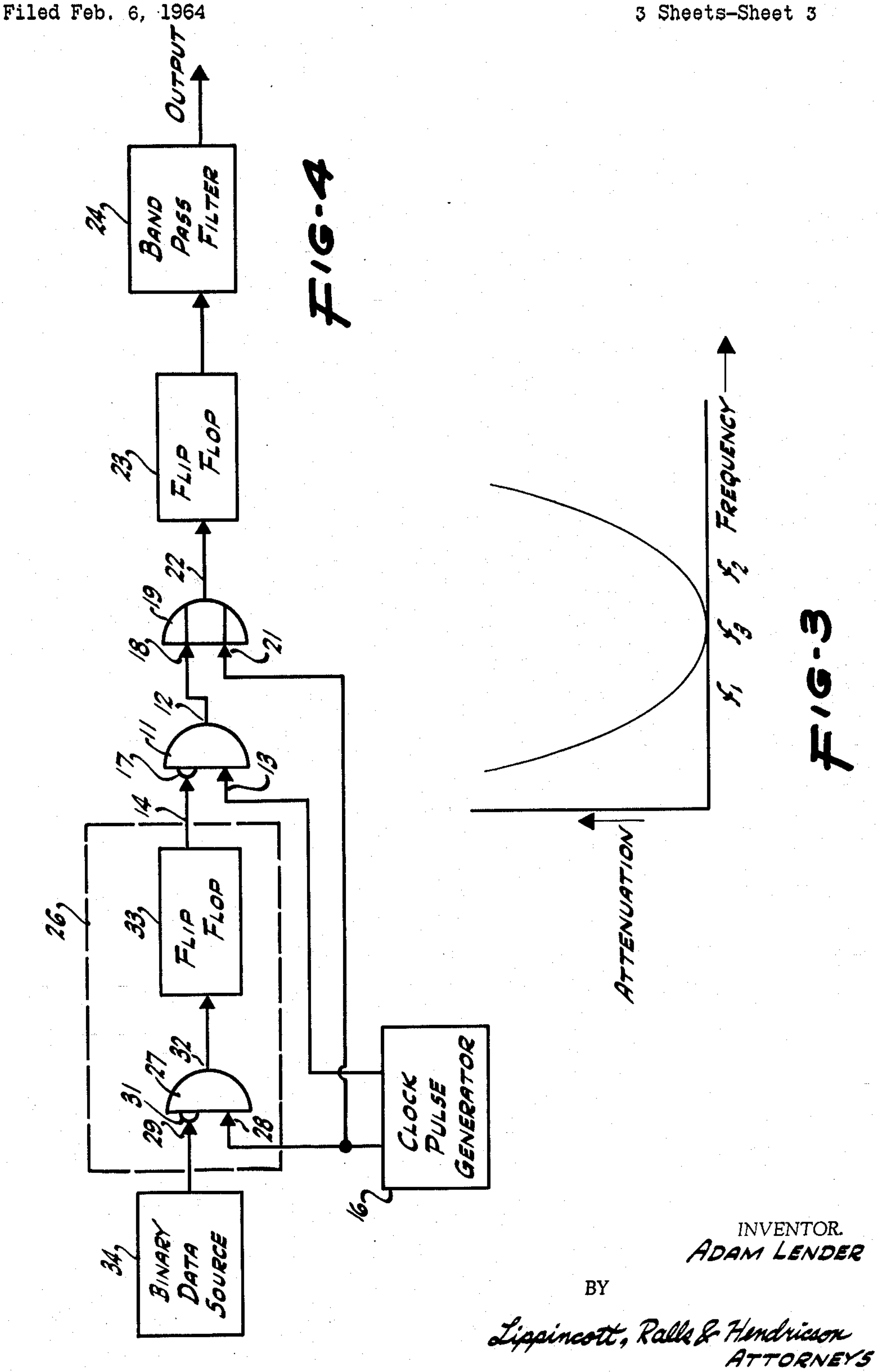
FIGURE 3 is a graphical representation of filtering characteristics which may be employed in the conversion process.
FIGURE 4 is a schematic circuit diagram of a system for conducting the conversion process.

Pulses $P_2$ are then added to clock pulses $C_3$ which have the same rate as, and are in phase with the clock pulses $C_1$. As a practical matter, clock pulses $C_3$ are the same as clock pulses $C_1$, but are separately identified herein for purposes of ease of illustration and description. From the addition of pulses $P_2$ and clock pulses $C_3$, there results a series of pulses $P_3$ which are in turn complemented to produce waveform D. It is to be noted that waveform D is the binary frequency modulated waveform of previous mention which varies between an upper and a lower frequency in a manner indicative of the digital input waveform A. It will be apparent from FIGURE 1 that the period of each cycle of the upper frequency variation of waveform D is equal to the bit interval T of the input waveform A. Consequently, the upper frequency is numerically equal to the bit rate or clock rate $1/T$. The lower frequency variation of waveform D has a period equal to 2 T and therefore a frequency equal to half the upper frequency. In the present case, the lower frequency of waveform D represents the binary "1" state of waveform B while the upper frequency represents the binary "0" state thereof. Of more importance, in successive bit intervals the waveform D exhibits a change or no change (C or NC) in frequency as the waveform A shifts between "mark" and "space" conditions as follows:

nents of the waveform D in a band between the upper and lower frequencies thereof are passed while frequency components outside of this band are suppressed. The attenuation vs. frequency characteristic of the filter is as depicted in FIGURE 3, and it will be noted that the attenuation is of relatively low order for frequencies between $f_1$ and $f_2$, which respectively designate the lower and upper frequencies. For frequencies less than $f_1$ and greater than $f_2$, the attenuation increases rapidly. Waveform D is, of course, comprised of a number of sinusoidal components having fundamental frequencies equal to those of the various periodicity patterns of the wave, and odd harmonics thereof. Two of the fundamental frequencies correspond to the lower and upper frequencies $f_1$ and $f_2$, and in regions of the waveform where the wave alternates consistently at these frequencies corresponding sinusoidal fundamental frequency components are provided in the output waveform E, from the filter or other selectively passive network. Odd harmonics of the fundamental frequencies $f_1$ and $f_2$ are not present in the waveform E because they are greater than the upper frequencies $f_2$ and are suppressed. However, the waveform E includes a third sinusoidal frequency component having a frequency $f_3$ midway between the frequencies $f_1$ and $f_2$. This component results from the binary frequency modulated waveform D containing a periodicity pattern with a fundamental frequency equal to one-fourth the upper frequency $f_2$. Such periodicity pattern exists in regions of the waveform where the wave shifts from one of the lower or upper frequencies to the other. One complete period of the pattern will be seen to be equal to four times the bit interval T by observing waveform D in bit intervals 4–7, for example, which is one complete cycle of the pattern corresponding to a steady "space" condition of the input waveform A. Thus, the fundamental frequency of this pattern is one-fourth the upper frequency, as noted hereinbefore. Such fundamental frequency, being less than the lower frequency $f_1$, is suppressed by the filtering action. However, odd harmonics of this fundamental are also included in the periodicity pattern. The third harmonic, moreover, is equal to three-fourths the upper frequency and is therefore the frequency $f_3$ at the center of the passband. The fifth and higher harmonics are greater than the upper frequency $f_2$ and are thus suppressed by the filtering action.

The sinusoidal frequency modulated waveform E produced by filtering of the waveform D thus includes three frequencies, $f_1$, $f_2$, and $f_3$. The center frequency $f_3$ is a carrier which is "not apparent" in the frequency modulated binary waveform D. In the sinusoidal waveform E, the carrier frequency, $f_3$, is indicative of one amplitude level, in the present instance "space", of the input wave-

| Bit Interval | 1 | 2 | 3 | 4 | 5 | 6 | 7 | 8 | 9 |
|---|---|---|---|---|---|---|---|---|---|
| Frequency Variation of D | NC | NC | NC | C | C | C | C | NC | NC |
| Mark-space Condition of A | M | M | M | S | S | S | S | M | M |

| Bit Interval | 10 | 11 | 12 | 13 | 14 | 15 | 16 | 17 |
|---|---|---|---|---|---|---|---|---|
| Frequency Variation of D | C | C | C | C | NC | C | NC | NC |
| Mark-space Condition of A | S | S | S | S | M | S | M | M |

Thus, it will be appreciated that the mark and space conditions of the input waveform A are respectively represented by "no change" and "change" in the frequency of waveform D.

The binary frequency modulated waveform D may next be converted to a sinusoidal frequency modulated waveform E by suitable filtering. Such filtering may be accomplished by passing the waveform D through a selectively passive network, e.g., the transmission medium of the communications system, a filter, or the like, having predetermined bandpass characteristics. The bandpass characteristics are selected such that frequency compoform A, as will be evident upon comparing these respective waveforms. The lower and upper frequencies $f_1$ and $f_2$ are both indicative of the second amplitude level of waveform A, in this case "mark."

Referring now to FIGURE 2, the straight binary data processing mode is graphically depicted therein and is next considered. A digital waveform A′ identical in pattern to waveform A but having a bit time slot T′ and bit speed $1/T'$, which under comparable conditions are respectively longer and slower than the time slot T and bit speed $1/T$ of the duobinary processing mode, is of a suitable binary pattern for direct processing in the straight binary mode. In this regard, the "space" condition, $s$, is synonymous with a binary "0" and the "mark" condition, $m$, is synonymous with a binary "1," for example. Waveform A′ is digitally combined with a series of clock pulses $C'_2$ having a rate such that the bit speed $1/T'$ of waveform A′ is a submultiple of the clock rate. In the illustrated case, the bit speed $1/T'$ is one-half the clock rate, which is taken to be equal that of the clock pulses $C_1$ and $C_2$ employed in the duobinary mode. On a comparable basis, the bit speed of waveform A′ in the straight binary mode is hence one-half the bit speed of the waveform A in the duobinary mode. Clock pulses $C'_2$ are so combined with waveform A′ that pulses $P'_2$ in time correspondence with the clock pulses are produced during binary "0" (space) intervals, but not for clock pulses occurring during binary "1" (mark) intervals of the waveform A′. As in the duobinary case, the inverse condition may be alternatively employed with pulses being produced for binary "1" and no pulses produced for binary "0."

Pulses $P'_2$ are added to clock pulses $C'_3$ which have the same rate as pulses $C'_2$, but are shifted in phase by 180° relative thereto. A series of pulses $P'_3$ result from the addition of pulses $P'_2$ and $C'_3$. Pulses $P'_3$ are in turn complemented to produce frequency modulated binary waveform D′ which varies between upper and lower frequencies in a manner which is indicative of the digital input waveform A′. The period of each cycle of the upper frequency variation of waveform D′ is equal to one-half the bit interval T′ of the input wave A′, while the period of the lower frequency variation is equal to the bit interval T′. Thus, the upper frequency is numerically equal to the clock rate and the lower frequency is numerically equal to one-half the clock rate. In the illustrated case where the clock rate employed in the straight binary mode is equal that employed in the duobinary mode, the lower and upper frequencies of waveform D′ are hence the same as the lower and upper frequencies $f_1$ and $f_2$ of the waveform D. As in the duobinary mode, the upper frequency of the binary frequency modulated waveform D′ represents the binary "0" state of the binary pattern being processed while the lower frequency represents the binary "1" state thereof, or vice versa. However, in the straight binary mode, the binary pattern is the digital input waveform A′, and, accordingly, in terms of the original data a "space" is represented by the upper frequency and a "mark" by the lower frequency of the waveform D′.

The waveform D′ may be converted to a sinusoidal frequency modulated waveform E′ by filtering in the manner previously described with respect to the duobinary mode. In this regard, the waveform D′ is transmitted through a selectively passive network having a bandpass characteristic as illustrated in FIGURE 3. Waveform D′ does not include a periodicity pattern of the type contained in waveform D which produces the third frequency component in the filtered sinusoidal output wave. Consequently, the sinusoidal waveform E′ includes only the lower and upper frequency components and is a sinusoidally shaped counterpart of waveform D′.

It is particularly important to note that in both the duobinary and straight binary modes of data processing in accordance with the present invention, the binary frequency modulated waves are synchronous with the digital input data. The phase of the binary frequency modulated wave is always continuous and it will be noted from waveforms D and D′ that changes in frequency take place only when the phase is 0° or 180°. Even if the bit speed of the input data varies, the modulation is still synchronous, the only effect being to shift the entire frequency spectrum of the binary frequency modulated wave up or down.

From the foregoing description of the doubinary and straight binary modes of processing data in accordance with the invention, it will be appreciated that in general terms there is provided a method of synchronously converting a digital waveform having a series of pulses of two discrete amplitude levels to frequency modulated pulses varying between lower and upper frequencies in a manner representative of the amplitude levels. In accordance with the method, serialized binary data (either the original digital data or a suitable binary conversion pattern thereof) is combined with a series of clock pulses, the bit rate of the binary data being equal to, or a submultiple of the clock rate. The binary data and clock pulses are so combined that output pulses are generated in time correspondence with the clock pulses when the clock pulses occur during portions of the binary waveform having one of the two binary levels thereof. No output pulses are generated for clock pulses occurring during portions of the binary waveform having the other binary level. The output pulses and a second series of clock pulses at the same rate as the first series of clock pulses, but shifted in phase by 180° relative thereto, are then complemented. This produces binary frequency modulated pulses varying between upper and lower frequencies equal to, respectively, the clock pulse rate and one-half the clock rate, and which are indicative of the original digital waveform. Thereafter, the binary frequency modulated pulses may be filtered to provide a sinusoidal frequency modulated waveform which is representative of the original data in a predetermined manner.

Aside from the advantages accruing from the binary frequency modulated waveform being synchronous with the input data, it is particularly important to note that the method of the invention may be conducted with circuitry which is relatively simple and compact compared to that employed heretofore to convert serialized binary data to a frequency modulated waveform. Previously, frequency modulation of digital data has generally entailed the use of carrier oscillators and analog modulators of relatively complex and expensive design. In accordance with the present invention, only simple ordinary digital circuits, in appropriate combination, are required to carry out the synchronous frequency modulation process. One suitable synchronous frequency modulation circuit is illustrated in FIGURE 4. The circuit includes an AND-gate 11, or the like, having an output 12 which is energized only when pulses exist coincidently at a pair of inputs 13 and 14. A clock pulse generator 16 is coupled to one input 13 and the other input 14 is adapted to receive serialized binary data. Pulses occur at output 12 in response to clock pulses applied to input 13 from generator 16 when one binary state of the data exists at input 14, but not when the other binary state exsists thereat. In this regard, an inverter 17 may be advantageously provided in input 14, in which case, output pulses are produced for binary "0" of the input data, but not for binary "1."

The gate output 12 is coupled to one input 18 of an OR-gate 19, or equivalent adder means. The other input 21 of gate 19 is coupled to a second output of clock pulse generator 16. The clock pulse generator is arranged such that the clock pulses applied to input 21 of gate 19 are shifted 180° in phase relative to the clock pulses applied to input 13 of gate 11. The OR-gate 19 functions in the usual manner to provide pulses at its output 22 in response to pulses appearing at its input 18 or input 21. As a result, in the output of gate 19, the clock pulses at input 21 are added to the output pulses of gate 11 appearing at input 18.

The output 22 of gate 19 is coupled in complementary triggering relation to a flip-flop 23, or equivalent bistable circuit. The flip-flop changes state in response to each pulse applied to its input, and consequently the flip-flop output is the complement of the pulses at the output of gate 19. The output of flip-flop 23 may then be applied to a bandpass filter 24, or equivalent selectively passive circuit, having an attenuation vs. frequency characteristic of the type illustrated in FIGURE 3 and discussed hereinbefore.

The circuit of FIGURE 4, as described above, may be operated in either the straight or duobinary modes of data processing. However, in the duobinary mode, the gate 11 is preceded by a suitable duobinary coder as indicated at 26. The coder preferably comprises an AND-gate 27 having an input 28 coupled to the same output of clock pulse generator 16 as the input 21 of gate 19. A second input 29 of gate 27, which advantageously includes an inverter 31, is adapted to receive serialized binary data to be processed in the duobinary mode. The output 32 of the gate 27 is coupled in complementary triggering relation to a flip-flop 33 or equivalent bistable circuit. The output of the flip-flop 33 comprises the output of coder 26, and in the doubinary mode is coupled to the input 14 of gate 11. The coder functions to convert the binary input data from a data source 34 to its digital differential. In this regard, the gate 27 provides an output in response to clock pulses applied to its input 28 for one state or level of the data applied to input 29, but not for the other. The gate output pulses are complemented by the flip-flop 33 to thus produce a binary pattern at its output which is the digital differential of the input data.

In the operation of the circuit in the duobinary mode of data processing, input digital data of the type depicted as waveform A of FIGURE 1 is applied from source 34 to the input coder 26, i.e., to input 29 of gate 27. The clock pulses $C_1$ are applied to input 28 of gate 27 at the same rate as the bit rate of the input data A. By virtue of the inverter 31, pulses appear at the gate output 32 in response to the "space" condition of the input data A, but not for "mark." Consequently, the pulse waveform $P_1$ is produced at the gate output 32, and upon triggering flip-flop 33 the digital differential waveform B is produced at the output thereof.

Waveform B and clock pulses $C_2$ are applied to the inputs 14 and 13 of gate 11, which by virtue of the inverter 17, produces output pulses $P_2$ for binary "0" of waveform B, but not for binary "1." The OR-gate 19 adds the pulses $P_2$, which appear at its input 18 to the clock pulses $C_3$ (identical to clock pulses $C_1$ and shifted 180° relative to clock pulses $C_2$) applied to its input 21 from clock generator 16. Pulses $P_3$ are thus produced at the OR-gate output 22 which upon triggering flip-flop 23 produce the binary frequency modulated waveform D at the flip-flop output. Waveform E is produced at the output of bandpass filter 24, in the manner described previously, in response to waveform D being applied to its input.

Operation of the circuit of FIGURE 4 in the straight binary mode is generally similar to that just described for the duobinary mode. However, in the straight binary mode, the coder 26 is dispensed with and the digital input data from source 34 is applied directly to input 14 of gate 11. In addition, the bit rate of the input data is one-half (as illustrated in FIGURE 2) or another submultiple of the clock pulse rate. Thus, in the straight binary mode the input data waveform A', which is identical in configuration to waveform A, but has one-half the bit rate, is applied to input 14 of gate 11. The rate of clock pulses $C'_2$ and $C'_3$ applied to the inputs 13 and 21 of gates 11 and 19, respectively, is the same as that employed in the duobinary mode with clock pulses $C_2$ and $C_3$. Operation of the circuit is likewise identical to that in the duobinary mode. However, the series of pulses $P'_2$ is now produced at output 12 of gate 11, and upon being added to clock pulses $C'_3$ by gate 19, the series of pulses $P'_3$ is produced at the gate output 22. Pulses $P'_3$ trigger flip-flop 23 to produce the binary frequency modulated waveform D' at its output. Sinusoidal waveform E' appears at the output of bandpass filter 24 with waveform D' applied to its input.

Typical values of parameters which may be employed with the invention in the duobinary mode are a bit rate of 2,400 bits per second of the input data A and a clock rate of 2,400 pulses per second for the clock pulses $C_1$, $C_2$, and $C_3$. This produces a binary frequency modulated waveform D which varies between an upper frequency of 2,400 cycles per second and a lower frequency of 1,200 cycles per second. The bandpass filter in this case then has a passband of 1,200 to 2,400 cycles per second and rapidly increasing attenuation for frequencies respectively greater than and less than 2,400 and 1,200 cycles per second. In particular, the attenuation, is virtually infinite for frequencies of 600 and 3,000 cycles per second. In other words, the attenuation vs. frequency characteristic of the filter is as shown in FIGURE 3 with the frequencies $f_1$ and $f_2$ being respectively 1,200 and 2,400 cycles per second. The periodicity pattern in the waveform D for alternately 1,200 and 2,400 cycles per second frequencies in successive bit intervals thus has a fundamental of 600 cycles per second. This fundamental and the 3,000 cycles per second fifth harmonic thereof are thus sharply attenuated. The 1,800 cycles per second third harmonic, however, is at the center of the 1,200–2,400 cycles per second passband of the filter and is thus the center frequency $f_3$ passed by the filter. The sinusoidal frequency modulated wave E consequently contains the frequencies 1,200 and 2,400 cycles per second, which are representative of the "mark" level of the input data A, and the center frequency 1,800 which is representative of the "space" level.

With the clock rate of 2,400 pulses maintained, in the straight binary mode an input data bit rate which is a submultiple of 2,400 pulses per second is employed. Accordingly, the input data bit rate is 1,200, 600, 300, 150, etc., bits per second. Any of these sub-multiple bit rates of the input data waveform A' produces lower and upper frequencies of 1,200 and 2,400 cycles per second, respectively, in the binary frequency modulated waveform D'. The bandpass filter thus has the same attenuation characteristic as that for the duobinary mode with a passband of from 1,200 to 2,400 cycles per second. The sinusoidal frequency modulated waveform E' thus varies between 1,200 and 2,400 cycles per second, 1,200 cycles per second being representative of "mark" and 2,400 cycles per second being representative of "space" in the input data.

It will be appreciated that the synchronous frequency modulated wave in both the duobinary and straight binary modes of processing may be re-converted, subsequent to transmission, to the form of the original input data by suitable receiver means known in the art. For example, the receiver portion of the circuit disclosed in my copending application Serial No. 299,379, filed August 1, 1963, for "Duobinary System," and assigned to the same assignee as the present application, may be employed to the foregoing end.

Although the invention has been described hereinbefore with respect to specific steps in the method and a single preferred embodiment of the apparatus thereof, no limitations are intended nor to be implied thereof, reference being made to the appended claims for a precise delineation of the true spirit and scope of the invention.

What is claimed is:

1. A method of synchronously converting a digital waveform having a series of pulses of two discrete amplitude levels and a given bit rate to frequency modulated pulses indicative of said digital waveform, comprising digitally differentiating said digital waveform and a series of associated clock pulses having a clock rate equal to the bit rate of the pulses of said waveform to thereby produce a digital differential of said waveform including a series of pulses varying between two discrete amplitude levels, digitally combining said digital differential with a second series of clock pulses at the same clock rate as said first series of clock pulses and shifted 180° in phase relative thereto to generate output pulses in time correspondence with said second series of clock pulses when same coincide in time with portions of the pulses of said differential at one of the amplitude levels thereof and to generate no output pulses when the second series of clock pulses coincide in time with portions of the pulses of said differential at the other of the amplitude levels thereof, and complementing said output pulses and said first series of clock pulses to thereby produce frequency modulated pulses changing between an upper frequency numerically equal to said clock rate and a lower frequency numerically equal to one-half said clock rate, and passing frequency components of said frequency modulated pulses in a band defined between said upper and lower frequencies while suppressing frequency components outside of said band to produce a sinusoidal frequency modulated wave wherein a frequency midway between said upper and lower frequencies is representative of said first amplitude level of said digital waveform and said upper and lower frequencies are representative of said second amplitude level of said digital waveform.

2. A method of synchronously converting a digital waveform having a series of pulses of two discrete amplitude levels and a given bit rate to frequency modulated pulses varying between upper and lower frequencies in a manner indicative of said amplitude levels, comprising digitally combining said digital waveform with a series of associated clock pulses having a rate such that the bit rate of the digital waveform is a submultiple of the clock pulse rate to generate output pulses in time correspondence with said clock pulses when said clock pulses coincide in time with one of said levels of said pulses of said digital waveform and to generate no output pulses when said clock pulses coincide in time with the other of said levels of said pulses of said digital waveform, complementing said output pulses and a second series of clock pulses at the same rate as the first series of clock pulses and shifted in phase by 180° relative thereto to thereby produce frequency modulated pulses changing between an upper frequency numerically equal to said clock rate and a lower frequency numerically equal to one-half said clock rate, and passing frequency components of said frequency modulated pulses in a band defined between said upper and said lower frequencies while suppressing frequency components outside of said band to produce a sinusoidal frequency modulated wave varying between said upper and lower frequencies.

3. Apparatus for the synchronous frequency modulation of binary data comprising input means for receiving binary data pulses and an associated series of clock pulses with the binary pulses fluctuating between two states and having a bit rate that is a submultiple of the clock pulse rate, digital gate circuit means coupled to said input means for combining said binary pulses and said clock pulses to generate output pulses in time correspondence with said clock pulses only in response to coincidences of said clock pulses with one of said states of said binary pulses but not with the other, means generating a second series of clock pulses at the same pulse rate as the first series of clock pulses and shifted in phase by 180° relative thereto, and digital bistable trigger circuit means coupled in receiving relation to said output pulses of said gate circuit means and said second series of clock pulses for complementing same and thereby producing frequency modulated pulses indicative of said binary data pulses varying between an upper frequency numerically equal to said clock pulse rate and a lower frequency numerically equal to one-half said clock pulse rate.

4. Apparatus for the synchronous frequency modulation of binary data comprising digital differentiator means receiving an input binary pulse waveform having a series of pulses of two discrete amplitude levels and receiving a series of clock pulses having a rate equal to the bit rate of the binary pulses, said differentiator means generating the digital differential of said binary waveform, said digital differential including pulses varying between two discrete amplitude levels, means generating a second series of clock pulses at the same pulse rate as the first series of clock pulses and shifted in phase by 180° relative thereto, a digital gate circuit means coupled in receiving relation to the digital differential pulses and to the second series of clock pulses for combining same to produce output pulses only in response to coincidences of said second series of clock pulses with one of said levels of said digital differential pulses but not with the other, and digital trigger circuit means coupled in receiving relation to said output pulses of said gate circuit means and said first series of clock pulses for complementing same and thereby producing binary frequency modulated pulses varying between an upper frequency numerically equal to said clock pulse rate and a lower frequency numerically equal to one-half said clock pulse rate, said binary frequency modulated pulses changing between said upper and lower frequencies each bit interval of said binary pulse waveform in response to one of said amplitude levels of the pulses thereof and maintaining either of said upper and lower frequencies each bit interval in response to the other of the amplitude levels of the binary pulses.

5. Apparatus according to claim 4, further defined by a bandpass filter receiving said binary frequency modulated pulses from said trigger circuit means, said filter having a passband defined between said upper and lower frequencies symmetrically disposed relative to a center frequency midway therebetween, said filter having a rapidly increasing attenuation for frequencies greater than and lower than said upper and lower frequencies respectively, said filter thereby producing a frequency modulated sinusoidal output wherein said center frequency is indicative of one of said amplitude levels of said input binary pulse waveform and either of said lower and upper frequencies is indicative of the other of said amplitude levels of said input binary pulse waveform.

6. Apparatus for the synchronous frequency modulation of binary data comprising an AND-gate having a first input adapted to receive serialized binary data, a second input adapted to receive clock pulses, and an output energized in response to coincidences of pulses at said second input with one level of said data at said first input but not with the other level thereof, an OR-gate having a first input coupled in receiving relation to the output of said AND-gate, a second input adapted to receive clock pulses, and an output energized in response to pulses at either of its inputs, a clock pulse generator for generating clock pulses at a rate such that the bit rate of said binary data is a submultiple of said clock rate, said clock pulse generator having first and second outputs from which series of said clock pulses shifted in phase by 180° relative to each other are derivable, said first and second outputs of said clock pulse generator respectively coupled to said second inputs of said AND and OR gates, and a flip-flop having an input and an output, said output of said OR-gate coupled in complementary triggering relation to the input of said flip-flop, whereby a binary frequency modulated wave varying between an upper frequency numerically equal to said clock rate and a lower frequency numerically equal to one-half said clock rate is generated at the output of said flip-flop.

7. Apparatus for the synchronous frequency modulation of binary data according to claim 6, further defined by a bandpass filter having its input connected to the output of said flip-flop, said filter having a passband between said lower and upper frequencies and sharply increasing attenuation for frequencies below and above said lower and upper frequencies.

8. Apparatus for the synchronous frequency modulation of binary data comprising an AND-gate having a first input adapted to receive serialized binary data, a second input adapted to receive clock pulses, and an output energized in response to coincidences of pulses at said second input with one level of said data at said first input but not with the other level thereof, a flip-flop having an input and an output, said output of said AND-gate coupled in complementary triggering relation to the input of said flip-flop, a second AND-gate having a first input coupled in receiving relation to the output of said flip-flop, a second input adapted to receive clock pulses, and an output energized in response to coincidences of pulses at said second input with one level of data at the first input thereof but not with the other level of the data thereat, an OR-gate having a first input coupled in receiving relation to the output of said second AND-gate, a second input adapted to receive clock pulses, and an output energized in response to pulses at either of its inputs, a clock pulse generator for generating clock pulses at a rate equal to the bit rate of said binary data at the first input of said AND-gate, said clock pulse generator having first and second outputs from which series of said clock pulses shifted in phase by 180° relative to each other are derivable, said first output of said clock pulse generator coupled to the second inputs of said first AND-gate and said OR-gate, said second output of said clock pulse generator coupled to said second input of said second AND-gate, and a second flip-flop having an input and an output, said output of said OR-gate coupled in complementary triggering relation to the input of said second flip-flop to thereby produce a binary frequency modulated wave at its output varying between an upper frequency numerically equal to said clock rate and a lower frequency numerically equal to one-half said clock rate in a manner indicative of said binary data.

9. Apparatus according to claim 8, further defined by bandpass filter means coupled in receiving relation to the output of said second flip-flop, said filter means having a passband between said lower and upper frequencies and sharply increasing attenuation characteristics for frequencies below and above said lower and upper frequencies.

10. Apparatus for synchronously converting a binary waveform having a series of pulses of two discrete amplitude levels to a duobinary frequency modulated waveform having a series of pulses with predetermined frequency variations indicative of said amplitude levels of said binary waveform which comprises input means for receiving pulses of said binary waveform, and means for producing duobinary frequency modulated pulses in response to said binary waveform as follows:

(a) duobinary pulses changing in frequency between an upper and a lower frequency during successive bit intervals of said binary pulses in response to binary pulses of one of said amplitude levels, and (b) duobinary pulses fixed in frequency at either of said upper or lower frequencies during successive bit intervals of said binary pulses in response to binary pulses of the other of said amplitude levels, whereby changing frequency of said duobinary pulses indicates one level of said binary pulses and fixed frequency of said duobinary pulses indicates the other level of said binary pulses.

11. Apparatus according to claim 10, further defined by said duobinary pulses changing in frequency between an upper and a lower frequency having a sinusoidal component with a frequency symmetrically intermediate said upper and lower frequencies and sinusoidal components with frequencies greater than and less than said upper and lower frequencies respectively, and selectively passive output network means receiving said duobinary frequency modulated pulses and having a passband between said upper and lower frequencies while being impassive to frequencies outside of said passband, said output network means thereby having a sinusoidal frequency modulated output wherein sinusoidal pulses at said frequency intermediate said upper and lower frequencies are indicative of one level of said binary pulses and sinusoidal pulses at both upper and lower frequencies are indicative of the other level of said binary pulses.

References Cited by the Examiner

IBM Technical Disclosure Bulletin, "Digital Signal Synchronous Modulation Circuits," Fang et al., April 1963, vol. 5, No. 11, pages 94–96.

Lenkurt Demodulator, "Duobinary Coding," February 1963, vol. 12, No. 2, pages 1–11, Lenkurt Electric Co., San Carlos, Calif.

ROY LAKE, *Primary Examiner.*

A. L. BRODY, *Assistant Examiner.*